US010578319B2

(12) United States Patent
Shin et al.

(10) Patent No.: US 10,578,319 B2
(45) Date of Patent: Mar. 3, 2020

(54) AIR CONDITIONER

(71) Applicant: Samsung Electronics Co., Ltd., Suwon-si (KR)

(72) Inventors: Moon Sun Shin, Suwon-si (KR); Sung Hyun Chun, Suwon-si (KR); Kwon Jin Kim, Suwon-si (KR); Jong Whal Kim, Suwon-si (KR); Hyeong Joon Seo, Suwon-si (KR); Yeon-Seob Yun, Suwon-si (KR); Won-Hee Lee, Yongin-si (KR); Chang-Woo Jung, Suwon-si (KR); Kang Ho Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 151 days.

(21) Appl. No.: 15/280,389

(22) Filed: Sep. 29, 2016

(65) Prior Publication Data
US 2017/0097162 A1 Apr. 6, 2017

(30) Foreign Application Priority Data

Oct. 1, 2015 (KR) ........................ 10-2015-0138299
Jan. 4, 2016 (KR) ........................ 10-2016-0000545

(51) Int. Cl.
*F24F 1/0014* (2019.01)
*F24F 1/005* (2019.01)
(Continued)

(52) U.S. Cl.
CPC .............. *F24F 1/0014* (2013.01); *F21V 3/00* (2013.01); *F21V 7/04* (2013.01); *F24F 1/0003* (2013.01);
(Continued)

(58) Field of Classification Search
CPC ...... F24F 1/0014; F24F 1/0033; F24F 1/0003; F24F 1/0029; F24F 13/20;
(Continued)

(56) References Cited

U.S. PATENT DOCUMENTS

| 2015/0131296 A1* | 5/2015 | O'Brien-Bernini ..... F21V 25/12 362/310 |
| 2015/0211763 A1 | 7/2015 | Zakula et al. |
| 2017/0166119 A1* | 6/2017 | Lee .......................... B60Q 3/14 |

FOREIGN PATENT DOCUMENTS

| CN | 101769572 | 7/2010 |
| CN | 103629798 | 3/2014 |

(Continued)

OTHER PUBLICATIONS

Chinese Office Action dated Dec. 4, 2018 in Chinese Patent Application No. 201610874029.1.
(Continued)

*Primary Examiner* — Edelmira Bosques
*Assistant Examiner* — Dana K Tighe
(74) *Attorney, Agent, or Firm* — Staas & Halsey LLP

(57) ABSTRACT

An air conditioner includes a main body, a blower fan disposed in the main body, a discharge panel including a main outlet configured to discharge air discharged from the blower fan and a plurality of fine outlets provided near the main outlet, an opening and closing member configured to move in forward and backward directions and open and close the main outlet, and a lighting apparatus disposed on a back surface of the opening and closing member and configured to emit light to a back side thereof. Since an area illuminated by the lighting apparatus is changed according to a position of the opening and closing member, a user intuitively identifies an operational state of the air conditioner.

12 Claims, 10 Drawing Sheets

(51) Int. Cl.
  *F24F 1/0007* (2019.01)
  *F21V 3/00* (2015.01)
  *F21V 7/04* (2006.01)
  *F24F 1/0003* (2019.01)
  *F24F 13/20* (2006.01)
  *F21V 8/00* (2006.01)
  *F21Y 115/10* (2016.01)
  *F21V 33/00* (2006.01)

(52) U.S. Cl.
  CPC ............ F24F 1/005 (2019.02); F24F 1/0007 (2013.01); F24F 13/20 (2013.01); G02B 6/0001 (2013.01); *F21V 33/0092* (2013.01); *F21Y 2115/10* (2016.08); *F24F 2221/02* (2013.01)

(58) Field of Classification Search
  CPC ......... F24F 2001/004; F24F 2001/0074; F24F 2221/02; F21V 31/00; F21V 3/00; F21V 7/04; G02B 6/0001; F21Y 2115/10
  USPC .................................................. 454/322, 236
  See application file for complete search history.

(56) References Cited

FOREIGN PATENT DOCUMENTS

| | | |
|---|---|---|
| CN | 104669987 | 6/2015 |
| CN | 104764183 | 7/2015 |
| JP | 2003-74951 | 3/2003 |
| KR | 20090085942 A * | 8/2009 |
| KR | 10-2014-0037985 | 3/2014 |
| KR | 10-1385288 | 4/2014 |
| KR | 10-2014-0089068 | 7/2014 |
| KR | 20140089068 A * | 7/2014 |
| KR | 10-2014-0146283 | 12/2014 |

OTHER PUBLICATIONS

Chinese Office Action dated Jul. 29, 2019 in Chinese Patent Application No. 201610874029.1.

* cited by examiner

AIR CONDITIONER

CROSS-REFERENCE TO RELATED APPLICATIONS

This application claims the benefit of Korean Patent Application Nos. 10-2015-0138299 and 10-2016-0000545, filed on Oct. 1, 2015 and Jan. 4, 2016, respectively, in the Korean Intellectual Property Office, the disclosures of which are incorporated herein by reference.

BACKGROUND

1. Field

Embodiments of the present disclosure relate to an air conditioner having a lighting apparatus which allows an operational state to be intuitively identified by a user.

2. Description of the Related Art

Generally, air conditioners are apparatuses which generate cool or warm air through a refrigeration cycle and cool or heat an indoor space by supplying the cool or warm air to the indoor space.

Recently, among such air conditioners, a general air conditioner including a main outlet, an opening and closing member which opens and closes the main outlet, and fine outlets which are provided near the main outlet and discharge air when the main outlet is closed by the opening and closing member has been proposed.

Therefore, the air conditioner may be provided to operate in a first mode so that air is discharged through the main outlet at a high speed by opening the main outlet, and to operate in a second mode so that air is discharged through the fine outlets at an extremely low speed by closing the main outlet using the opening and closing member.

However, in such an air conditioner, since the main outlet is closed by the opening and closing member and the air is discharged through the fine outlets at a very low speed when the air conditioner is operating in the second mode, it is difficult to determine whether the air conditioner is operating through visual and tactile senses.

SUMMARY

Therefore, it is an aspect of the present disclosure to provide an air conditioner having a lighting apparatus which allows an operational state to be intuitively identified by a user.

Additional aspects of the disclosure will be set forth in part in the description which follows and, in part, will be obvious from the description, or may be learned by practice of the disclosure.

In accordance with one aspect of the present disclosure, an air conditioner includes a main body, a blower fan disposed in the main body, a discharge panel including a main outlet configured to discharge air discharged from the blower fan and a plurality of fine outlets provided near the main outlet, an opening and closing member configured to move in forward and backward directions and open and close the main outlet, and a lighting apparatus disposed on a back surface of the opening and closing member and configured to emit light to a back side thereof.

Also, the main outlet may be formed in a circular shape, and the opening and closing member may include an opening and closing part formed in a disc shape and configured to open and close the main outlet.

Also, the lighting apparatus may be formed in a ring shape and disposed on the back surface of the opening and closing part.

Also, the opening and closing member may include a mounting groove formed in a concave ring shape and provided on a back surface thereof, and the lighting apparatus may include a light source formed in a ring shape and accommodated in the mounting groove.

Also, the lighting apparatus may further include a transparent window formed of a transparent material so that light passes through the transparent window, formed in a ring shape, and configured to cover the mounting groove.

Also, the light source may include a substrate, a light-emitting diode (LED) disposed on the substrate, and a light guide member formed in a ring shape.

Also, the LED may include a pair of LEDs respectively disposed on both surfaces of the substrate.

Also, the light guide member may include a plurality of light guide parts configured to extend in an arc shape, and a plurality of installation parts provided between the plurality of light guide parts, wherein a groove is formed in each of the installation parts, and the substrate, which has the LEDs respectively installed on both surfaces thereof, is installed in the groove.

Also, the light guide member may include a reflecting part provided on a front surface thereof in a form of a prism and configured to reflect light to a back side thereof.

Also, the opening and closing member may include a moving part configured to extend backward from a center of the back surface of the opening and closing part, the main body may include a transfer guide provided therein and having the moving part movably installed therein, and the transfer guide may have a diameter which gradually increases in a backward direction of the transfer guide.

In accordance with another aspect of the present disclosure, an air conditioner includes a discharge panel including at least one main outlet and fine outlets provided near the main outlet, an opening and closing member configured to move in forward and backward directions and open and close the main outlet, and a lighting apparatus installed on a back surface of the opening and closing member, and the lighting apparatus illuminates a portion adjacent to the main outlet of the discharge panel as the opening and closing member moves forward, and illuminates the entire discharge panel through the fine outlets as the opening and closing member moves backward.

Also, the main outlet may be formed in a circular shape, the opening and closing member may include an opening and closing part formed in a disc shape and configured to open and close the main outlet, and the lighting apparatus may be formed in a ring shape.

Also, the air conditioner may further include a transfer guide disposed inside the main outlet, the opening and closing member may include a moving part configured to extend backward from a center of a back surface of the opening and closing part and to be movably installed in the transfer guide, and the transfer guide may have a diameter which gradually increases in a backward direction of the transfer guide.

DETAILED DESCRIPTION

Figure 1:
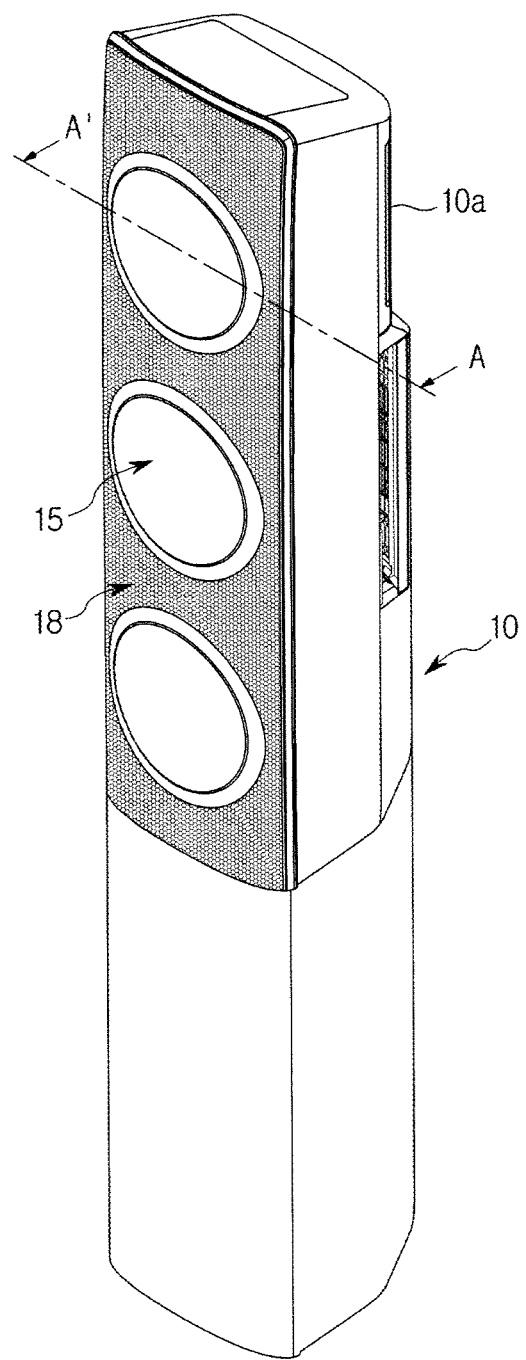
FIG. 1 is a perspective view illustrating an air conditioner in accordance with one embodiment of the present disclosure.

Reference will now be made in detail to the embodiments, examples of which are illustrated in the accompanying drawings, wherein like reference numerals refer to like elements throughout. The embodiments are described below to explain the present disclosure by referring to the figures.

An air conditioner is an apparatus used for cooling or heating an indoor space through a refrigeration cycle, and an air conditioner used for cooling an indoor space will be described as an example in one embodiment of the present disclosure.

The refrigeration cycle used in the air conditioner includes a compressor, which compresses a refrigerant at a high temperature and with a high pressure, a condenser, in which the refrigerant compressed by the compressor is cooled and condensed by air, an expansion valve, which decompresses and expands the refrigerant condensed by the condenser, and an evaporator which evaporates cool air expanded in the expansion valve by absorbing heat from the air.

The air conditioner includes an outdoor unit disposed in an outdoor space and an indoor unit disposed in an indoor space. The outdoor unit includes an outdoor blower fan which allows heat to be exchanged between outdoor air and the refrigerant passing through the condenser in addition to the above-described compressor, condenser, and expansion valve, and the indoor unit includes an indoor blower fan which allows heat to be exchanged between indoor air and the refrigerant passing through the evaporator in addition to the above-described evaporator.

The air conditioner may be provided to cool an indoor space by supplying air having a low temperature which is deprived of heat by the evaporator into the indoor space.

Hereinafter, an air conditioner in accordance with one embodiment of the present disclosure will be described with reference to the drawings in detail.

Figure 2:
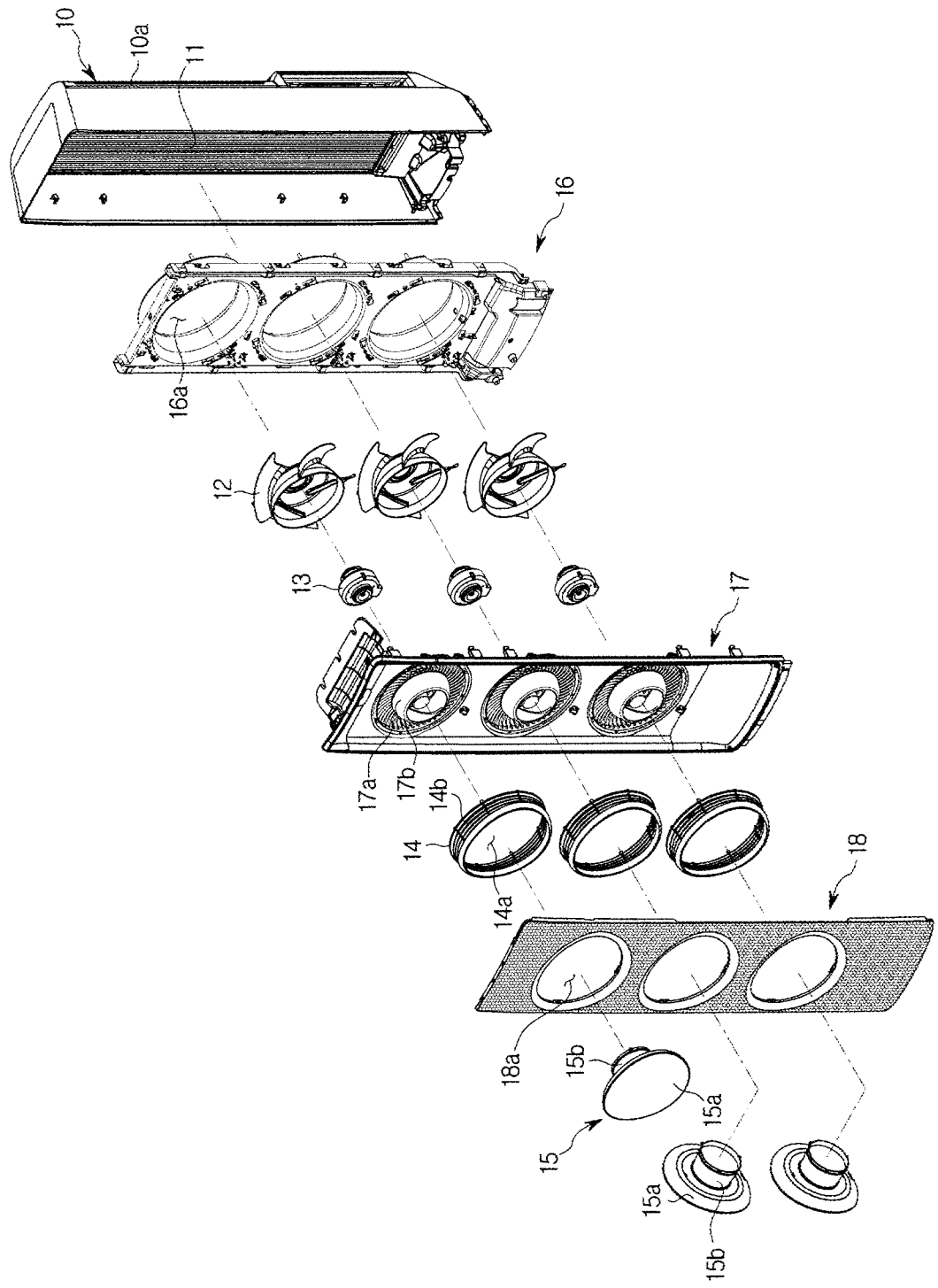
FIG. 2 is an exploded perspective view illustrating the air conditioner in accordance with one embodiment of the present disclosure.
Figure 3:
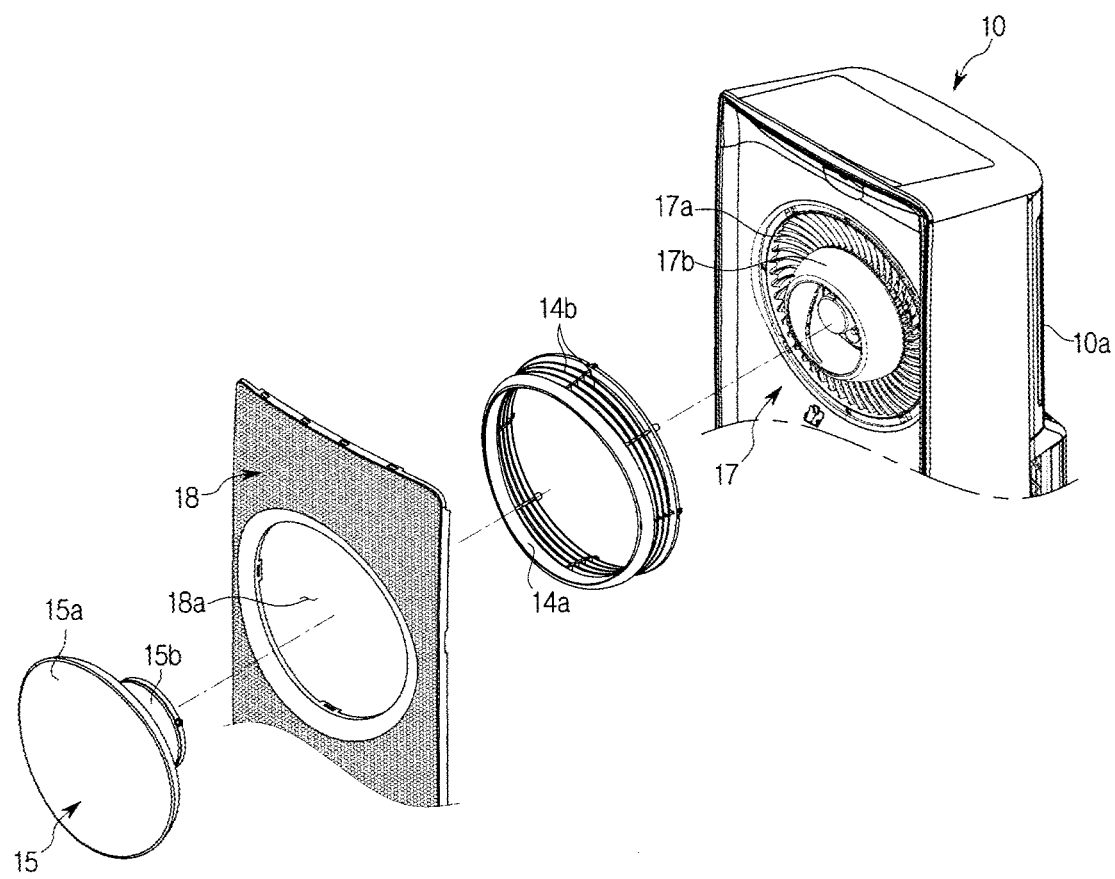
FIG. 3 is an exploded perspective view illustrating an installation state of an opening and closing member of the air conditioner in accordance with one embodiment of the present disclosure.

The air conditioner in accordance with one embodiment of the present disclosure includes a main body 10 which forms an exterior thereof, an evaporator 11 which is disposed at a back side of an inside of the main body 10 and cools air by performing heat exchange with air suctioned into the main body 10, blower fans 12 which allow the air to be suctioned into the main body 10 and to be discharged outside the main body 10 again by suctioning and discharging the air while rotating, and driving motors 13 which operate the blower fans 12 as illustrated in FIGS. 1 to 3.

The main body 10 includes an inlet 10a which suctions air and is provided on a back surface thereof, and a discharge panel 18 having main outlets 18a and disposed on a front surface thereof. In the present embodiment, the discharge panel 18 is formed in a vertically long rectangular plate shape to form a front surface of the main body 10, and three main outlets 18a are vertically provided in the discharge panel 18. Also, in the discharge panel 18, fine outlets 18b formed to have a very small size compared to the main outlets 18a are substantially and uniformly provided near the main outlets 18a.

Each of the main outlets 18a is formed in a circular shape, and an opening and closing member 15, which is installed to be rotatable in forward and backward directions and opens and closes the main outlet 18a, is disposed in each of the main outlets 18a. Also, although not illustrated in the drawings, transfer units for moving the opening and closing member 15 in forward and backward directions are disposed inside the main body 10. In the present embodiment, the transfer units are respectively disposed in transfer guides 17b installed in a discharge guide frame 17 which will be described below.

The evaporator 11 extends vertically, and the blower fans 12 include three blower fans 12 which are vertically disposed to respectively correspond to an upper portion, an intermediate portion, and a lower portion of the evaporator 11. In the present embodiment, the blower fan 12 is provided with a mixed flow fan in which the evaporator 11 provided at a back side thereof suctions air and obliquely discharges the air to a front side thereof.

Also, the main body 10 includes a suction guide frame 16 which is disposed in front of the evaporator 11 and guides the air suctioned into the blower fans 12, and the discharge guide frame 17 which is disposed in front of the suction guide frame 16 and guides air discharged from the blower fans 12.

The suction guide frame 16 includes suction flow paths 16a in which the blower fans 12 are disposed and which guide the air suctioned from the evaporator 11. In the present embodiment, the suction guide frame 16 includes three suction flow paths 16a which are vertically provided to correspond to the three blower fans 12.

The discharge guide frame 17 has a front surface spaced apart from a back surface of the discharge panel 18 and includes flow paths which guide the air discharged from the blower fans 12 to the fine outlets while the main outlets 18a are closed.

The discharge guide frame 17 includes discharge grills 17a which are formed in a ring shape and guide the air discharged from the blower fans 12. In the discharge guide frame 17, the transfer guides 17b each including the transfer unit (not illustrated) which allows the opening and closing member 15 to be moved in forward and backward directions are respectively disposed at centers of front surfaces of the discharge grills 17a, and the above-described driving motors 13 are respectively installed at centers of back surfaces of the discharge grills 17a. That is, the transfer guides 17b are respectively disposed inside the main outlets 18a to guide movement of the opening and closing member 15.

In the present embodiment, the transfer guide 17b has a width which gradually increases in a backward direction of the transfer guide 17b and is formed in a substantially truncated conical shape. That is, side surfaces of the transfer guide 17b are formed as inclined surfaces. An outer surface of the transfer guide 17b is formed of a white or metallic material so that light is easily reflected.

Also, discharge guides 14 which are formed in a substantially ring shape and guide air passing through the discharge grills 17a are installed on the front surface of the discharge guide frame 17.

Each of the discharge guides 14 includes a first opening 14a which is connected to the main outlet 18a provided in front thereof and guides air to the main outlet 18a, and a second opening 14b which radially guides the air outward. The first opening 14a is opened and closed by the opening and closing member 15 with the main outlet 18a.

Therefore, the air discharged from the blower fans 12 is discharged through the first openings 14a and the main outlets 18a while the main outlet 18a and the first opening 14a are open, and the air discharged from the blower fans 12 is transferred to the flow path between the discharge panel 18 and the discharge guide frame 17 through the second openings 14b while the main outlet 18a and the first opening 14a are closed.

The opening and closing member 15 includes an opening and closing part 15a which is formed in a disc shape to correspond to the main outlet 18a and opens and closes the main outlet 18a, and a moving part 15b which extends backward from a center of a back surface of the opening and closing part 15a and is movably installed in the transfer guide 17b.

Therefore, while the opening and closing member 15 is moved forward by the transfer unit and the main outlets 18a are open (a first mode), the air discharged from the blower fans 12 is discharged through the first openings 14a of the discharge guides 14 and the main outlets 18a at a high speed.

Also, while the opening and closing member 15 is moved backward by the transfer unit and the main outlets 18a are closed (a second mode), the air discharged from the blower fans 12 is transferred to the flow path between the discharge panel 18 and the discharge guide frame 17 through the second openings 14b of the discharge guides 14 and is then discharged through the fine outlets provided in the discharge panel 18 at a low speed.

Figure 4:
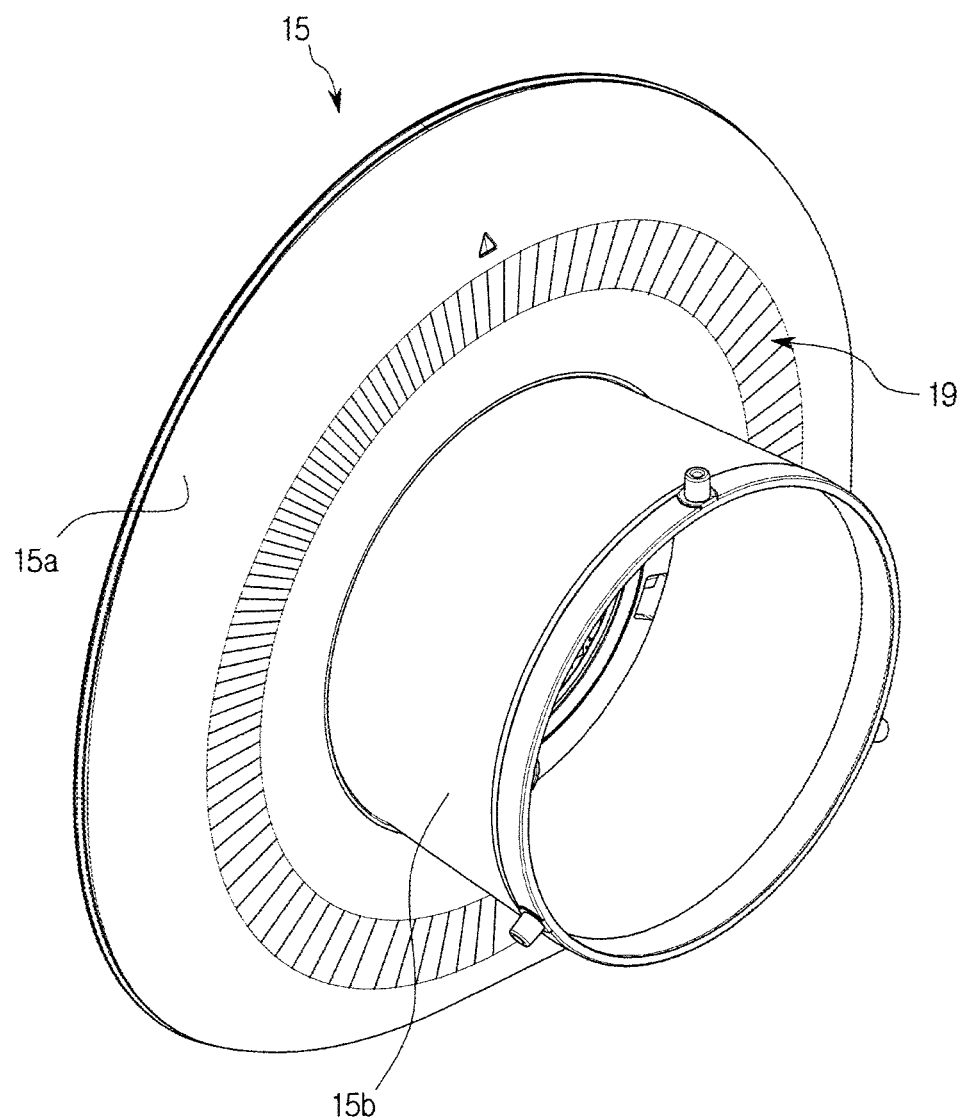
FIG. 4 is a rear perspective view illustrating the opening and closing member of the air conditioner in accordance with one embodiment of the present disclosure.
Figure 5:
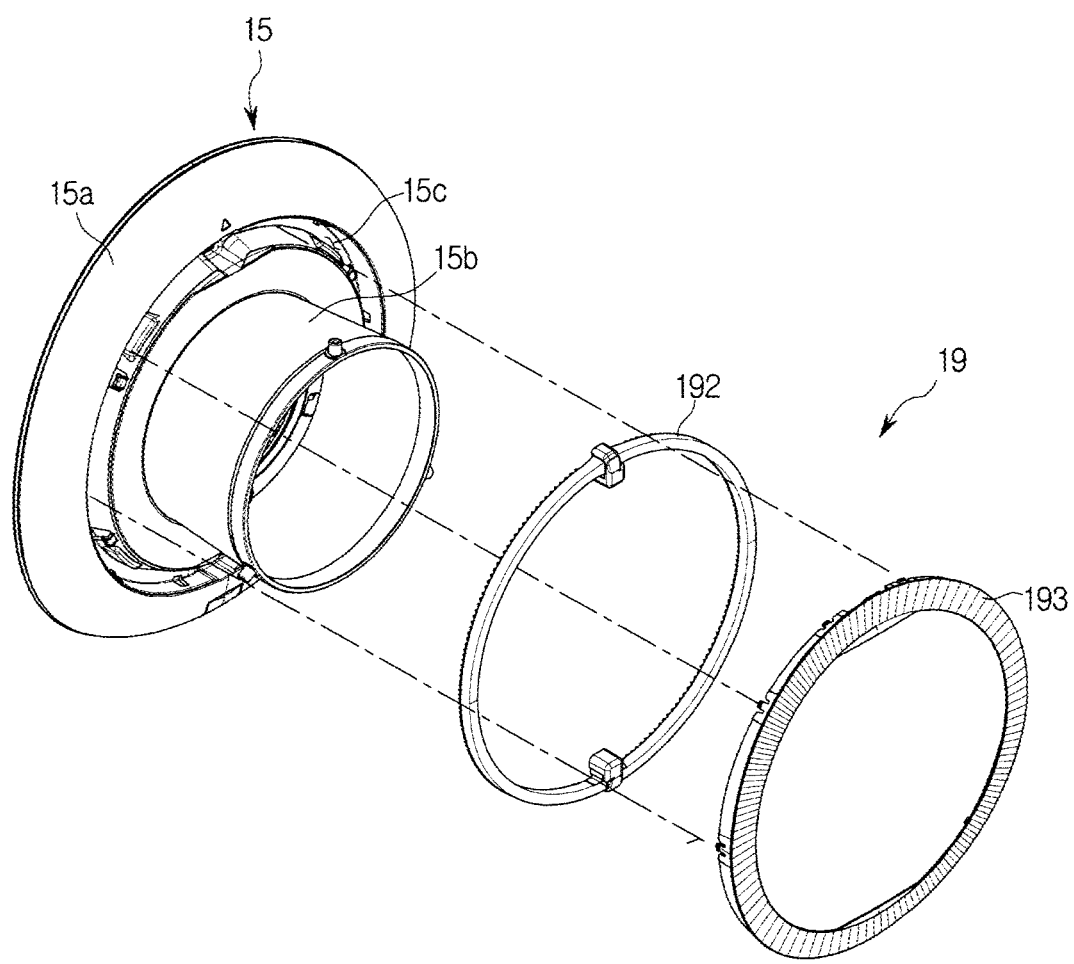
FIG. 5 is an exploded perspective view illustrating an installation state of a lighting apparatus of the air conditioner in accordance with one embodiment of the present disclosure.
Figure 6:
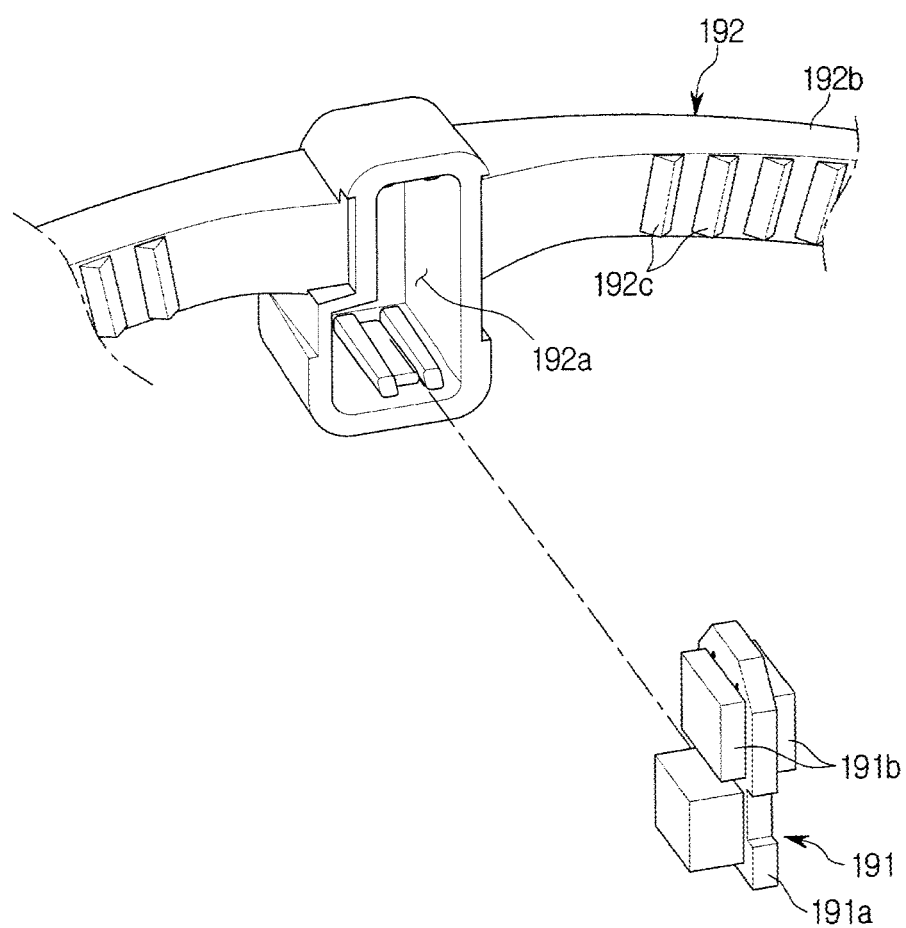
FIG. 6 is an exploded perspective view illustrating an installation state of a substrate and light-emitting diodes (LEDs) of the air conditioner in accordance with one embodiment of the present disclosure.

Also, the air conditioner in accordance with one embodiment of the present disclosure includes a lighting apparatus 19 disposed on the back surface of the opening and closing part 15a of the opening and closing member 15 as illustrated in FIGS. 4 and 5.

The lighting apparatus 19 is formed in a ring shape and installed on the back surface of the opening and closing part 15a, and a mounting groove 15c in which the lighting apparatus 19 is mounted is provided on the back surface of the opening and closing part 15a in a concave ring shape.

The lighting apparatus 19 includes a light source, which generates light, and a transparent window 193, which is formed of a transparent material, covers the mounting groove 15c, and protects the light source installed in the mounting groove 15c.

The light source includes an illuminant 191 which generates light. In the present embodiment, the illuminant 191 includes a substrate 191a, light-emitting diodes (LEDs) 191b installed in the substrate 191a, and a light guide member 192 which is formed of a transparent material, is formed in a ring shape, and guides the light generated by the LEDs 191b. In the present embodiment, the LEDs 191b may be respectively installed on both surfaces of the substrate 191a and may generate light at both sides thereof.

The light guide member 192 includes two light guide parts 192b which are formed in an arc shape and guide light, and two installation parts 192a which are each provided between both ends of the two light guide parts 192b, wherein a groove is formed in each of the installation parts 192a, and the substrate 191a which has the LEDs 191b respectively installed on both surfaces thereof is installed in the groove. In this case, the LEDs 191b are disposed to face the ends of the light guide parts 192b.

Therefore, since the light generated by the LEDs 191b is incident through the ends of the light guide part 192b and moves along the light guide parts 192b having an arc shape, a ring shaped light source which generates light is formed.

Also, a reflecting part 192c in a form of a prism may be provided on a front surface of the light guide member 192 and may more efficiently reflect the light incident in the light guide member 192 to a back side thereof.

In the present embodiment, although the two light guide parts 192b and the two installation parts 192a are provided, this is provided as an example, and three or more light guide parts 192b and installation parts 192a may be formed as necessary.

As described above, when the lighting apparatus 19 is disposed on the back surface of the opening and closing member 15 which moves in the forward and backward directions, an area illuminated by the lighting apparatus is changed according to a position of the opening and closing member 15.

Figure 7:
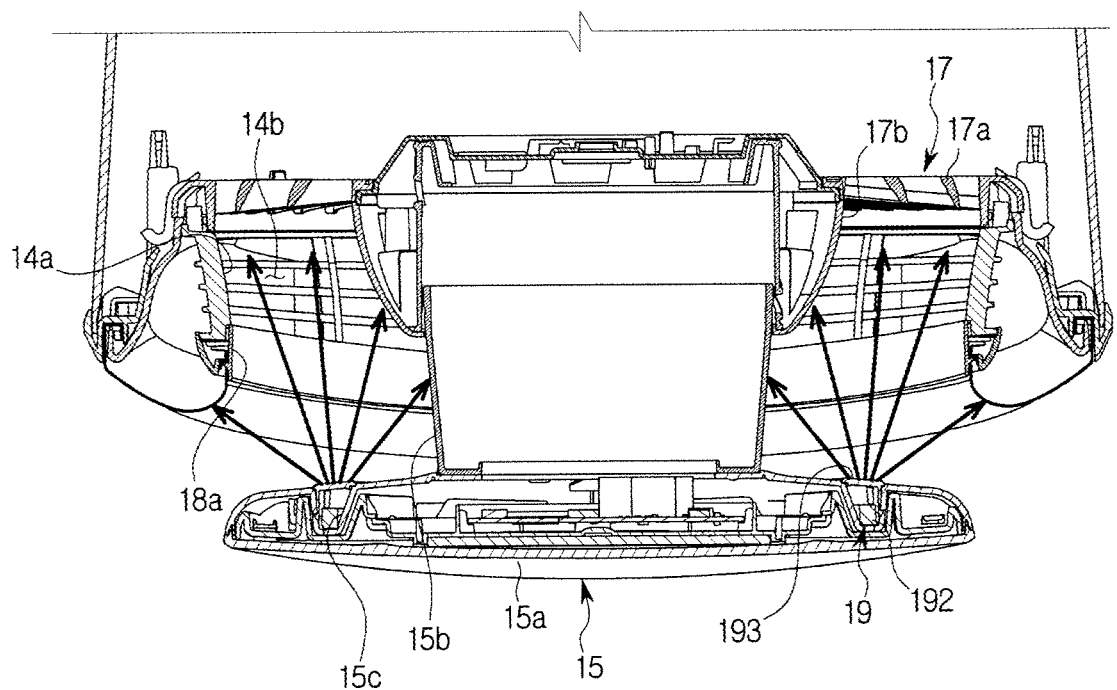
FIG. 7 is a top cross-sectional view illustrating a state in which the air conditioner in accordance with one embodiment of the present disclosure operates in a first mode.
Figure 9:
FIG. 9 is a perspective view illustrating the state in which the air conditioner in accordance with one embodiment of the present disclosure operates in the first mode.

As illustrated in FIGS. 7 and 9, when the lighting apparatus 19 emits light to a back side thereof while the opening and closing member 15 is moved forward and the main outlet 18a is open, that is, while the air conditioner operates in the first mode, most of the light emitted from the lighting apparatus 19 is emitted into the main body 10 and only some of the light illuminates an area at an outer side of the discharge panel 18 adjacent to the main outlet 18a. That is, a user may identify that air is being discharged through the main outlet 18a.

Figure 8:
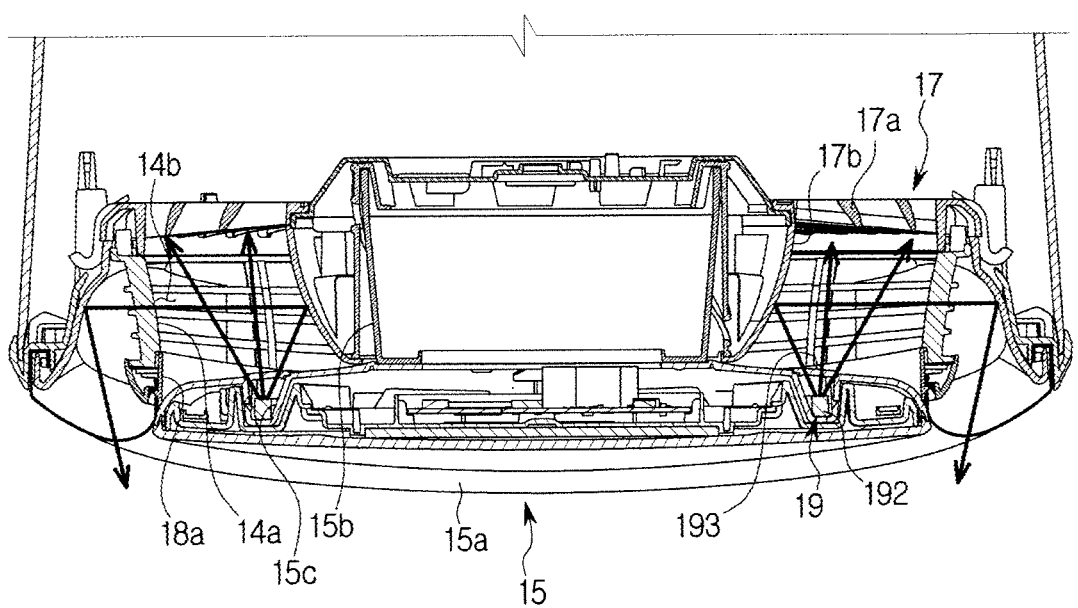
FIG. 8 is a top cross-sectional view illustrating a state in which the air conditioner in accordance with one embodiment of the present disclosure operates in a second mode.
Figure 10:
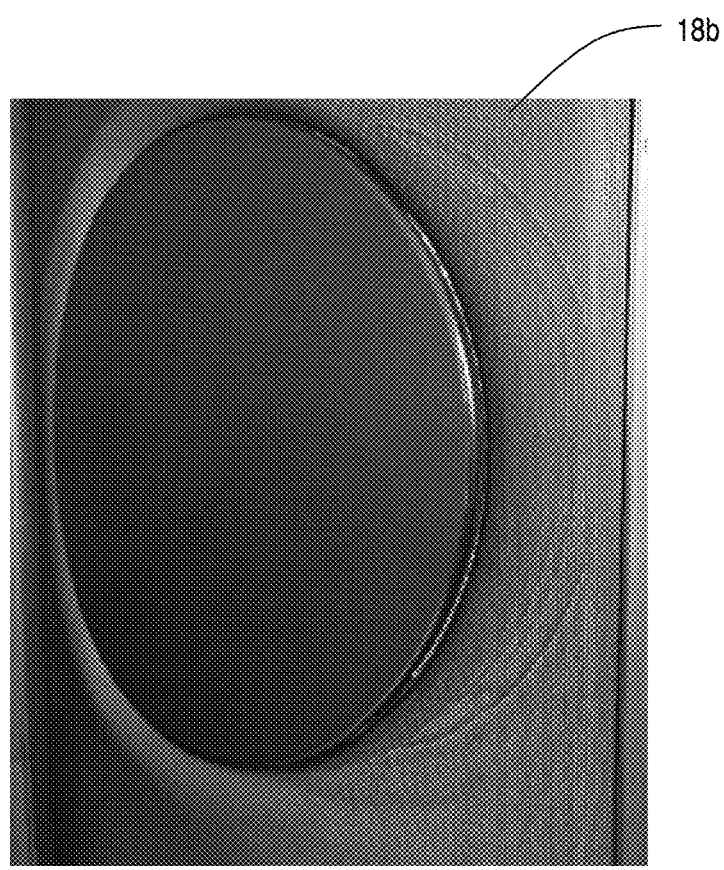
FIG. 10 is a perspective view illustrating the state in which the air conditioner in accordance with one embodiment of the present disclosure operates in the second mode.

Also, as illustrated in FIGS. 8 and 10, when the lighting apparatus 19 emits light to a back side thereof in the lighting apparatus 19 while the opening and closing member 15 is moved backward and the main outlet 18a and the first opening 14a are closed, that is, while the air conditioner operates in the second mode, light emitted inward of the light emitted from the lighting apparatus 19 is reflected by the side surfaces of the transfer guide 17b formed as inclined surfaces to be transferred to a space between the discharge panel 18 and the discharge guide frame 17 through the second opening 14b provided in the discharge guides 14, and is reflected by the front surface of the discharge guide frame 17 again to be transferred to a front side of the main body 10 through the fine outlets 18b. That is, the user may easily identify that the entire discharge panel 18 is being illuminated and air is being discharged through the fine outlets 18b provided in the entire discharge panel 18 when the air conditioner operates in the second mode.

That is, whether the air conditioner operates in the first mode or the second mode may be determined through an area illuminated by the light.

In the present embodiment, the light source includes the substrate 191*a*, the LEDs 191*b*, and the light guide member 192, but the present disclosure is not limited thereto and various types of linear light sources formed in a ring shape may be used.

Also, in the present embodiment, the light source guides the light generated by the LEDs 191*b* through the light guide member 192 having a ring shape and the lighting apparatus 19 is formed in a ring shape, but the present disclosure is not limited thereto and a plurality of LEDs which emit light to a back side thereof may be disposed to be spaced apart from each other in a circumferential direction.

As is apparent from the above description, in the air conditioner according to the present disclosure, since an area which is illuminated by a lighting apparatus is changed according to the movement of an opening and closing member, a user can intuitively identify an operational mode of the air conditioner.

The present disclosure is not limited to the embodiments described above, and it should be clear to those skilled in the art that various changes and modifications thereto are possible without departing from the spirit and scope of the present disclosure. Therefore, the changes and modifications fall within the scope of the appended claims of the present disclosure.

What is claimed is:

1. An air conditioner comprising:
a main body;
a blower fan disposed in the main body;
a discharge panel including a main outlet configured to selectively discharge air discharged from the blower fan, and a plurality of fine outlets provided near the main outlet to discharge air discharged from the blower fan;
an opening and closing member configured to move in forward and backward directions to open and close the main outlet, so that when the main outlet is closed, air from the blower fan is blocked from being discharged from the main outlet to an outside of the air conditioner, and is discharged from the plurality of fine outlets to the outside of the air conditioner; and
a lighting apparatus disposed on a back surface of the opening and closing member and configured to emit light to a back side of the opening and closing member,
wherein when the main outlet is closed, light from the lighting apparatus is blocked from being emitted from the main outlet to the outside of the air conditioner, and is emitted from the plurality of fine outlets to the outside of the air conditioner.

2. The air conditioner according to claim 1, wherein:
the main outlet is formed in a circular shape;
the opening and closing member includes an opening and closing part formed in a disc shape and configured to open and close the main outlet; and
the lighting apparatus is formed in a ring shape and disposed on a back surface of the opening and closing part.

3. The air conditioner according to claim 2, wherein:
the opening and closing member includes a moving part configured to extend backward from a center of the back surface of the opening and closing part;
the main body includes a transfer guide provided therein and having the moving part movably installed therein; and
the transfer guide has a diameter which gradually increases in a backward direction of the transfer guide.

4. The air conditioner according to claim 1, wherein:
the opening and closing member includes a mounting groove formed in a concave ring shape and provided on the back surface thereof; and
the lighting apparatus includes a light source formed in a ring shape and accommodated in the mounting groove.

5. The air conditioner according to claim 4, wherein the lighting apparatus further includes a transparent window formed in a ring shape of a transparent material so that light passes through the transparent window, and configured to cover the mounting groove.

6. The air conditioner according to claim 4, wherein the light source includes a substrate, a light-emitting diode (LED) disposed on the substrate, and a light guide member formed in a ring shape.

7. The air conditioner according to claim 6, wherein the LED includes a pair of LEDs respectively disposed on both surfaces of the substrate.

8. The air conditioner according to claim 7, wherein the light guide member includes a plurality of light guide parts configured to extend in an arc shape, and a plurality of installation parts provided between the plurality of light guide parts, wherein a groove is formed in each of the installation parts, and the substrate, which has the LEDs respectively installed on both surfaces thereof, is installed in the groove.

9. The air conditioner according to claim 6, wherein the light guide member includes a reflecting part provided on a front surface thereof in a form of a prism and configured to reflect light to a back side thereof.

10. An air conditioner comprising:
a discharge panel including at least one main outlet and fine outlets provided near the main outlet;
an opening and closing member configured to move in forward and backward directions to open and close the main outlet; and
a lighting apparatus installed on a back surface of the opening and closing member,
wherein the lighting apparatus illuminates a portion adjacent to the main outlet of the discharge panel when the opening and closing member is positioned in the forward direction and the main outlet is open, and illuminates the entire discharge panel through the fine outlets while light from the lighting apparatus is blocked from being emitted from the main outlet to the outside of the air conditioner when the opening and closing member is positioned in the backward direction and the main outlet is closed.

11. The air conditioner according to claim 10, wherein:
the main outlet is formed in a circular shape;
the opening and closing member includes an opening and closing part formed in a disc shape and configured to open and close the main outlet; and
the lighting apparatus is formed in a ring shape.

12. The air conditioner according to claim 11, further comprising a transfer guide disposed inside the main outlet, wherein:
the opening and closing member includes a moving part configured to extend backward from a center of a back surface of the opening and closing part and to be movably installed in the transfer guide; and
the transfer guide has a diameter which gradually increases in a backward direction of the transfer guide.

* * * * *